United States Patent
Conrad

[15] 3,672,524
[45] June 27, 1972

[54] SUPPORT ASSEMBLY FOR CAMPER

[72] Inventor: Martin B. Conrad, 1980 Paquita Drive, Carpinteria, Calif. 93013

[22] Filed: Nov. 23, 1970

[21] Appl. No.: 91,954

[52] U.S. Cl. ............................................... 214/515, 254/49
[51] Int. Cl. ......................................... B60p 3/32, B60p 1/64
[58] Field of Search .................. 214/515; 254/45; 254/49, 50

[56] References Cited

UNITED STATES PATENTS

| | | | |
|---|---|---|---|
| 3,202,304 | 8/1965 | Lannen | 214/515 X |
| 493,980 | 3/1893 | Coler | 214/515 X |
| 1,048,872 | 12/1912 | Morgan | 254/45 |
| 2,983,394 | 5/1961 | McKee | 214/515 X |
| 416,519 | 12/1889 | Troxell | 214/515 X |
| 3,251,494 | 5/1966 | Pulliam | 214/515 X |

Primary Examiner—Albert J. Makay
Attorney—Lyon & Lyon

[57] ABSTRACT

A support assembly for a camper unit normally carried on the body of a pickup truck is provided with laterally spaced horizontal side rails. These side rails rest on the truck body and support the camper unit along its side edges. Two forward posts are secured to a transverse horizontal member at their upper ends and this member is pivotally connected to the side rails at their forward ends. Two rear posts are each pivoted at the upper end to one of the side rails, respectively, and a second transverse horizontal member extends between the rear posts and is secured to them at a location below their pivotal connections to the side rails. A pair of tie rods each pivotally connect a forward post to a rear post. The camper unit may thus be raised off the truck body by resting the lower ends of the posts in inclined position on the ground and then moving the truck body rearward to bring the posts to vertical position. Each post is provided with an adjustably extensible foot piece. Angular tension elements maintain the posts in vertical position.

1 Claim, 3 Drawing Figures

PATENTED JUN 27 1972

3,672,524

INVENTOR
MARTIN B. CONRAD
BY
Lyon & Lyon
ATTORNEYS

SUPPORT ASSEMBLY FOR CAMPER

This invention relates to apparatus for supporting a camper unit normally carried upon a body of a pickup truck. More particularly, this invention relates to apparatus for supporting the camper unit in free-standing position in the absence of the pickup truck. The apparatus also employs the power of the truck acting through inclined posts to raise the camper unit upward and thereby relieve the truck of the weight of the camper unit, and permit independent use of the truck.

Prior art devices have commonly employed screw jacks to lift the camper unit upward off the body of the pickup truck, so that the pickup truck can be used independently of the camper unit. However, such screw jack devices are cumbersome to use and they do not provide a stable support for the camper unit in free-standing position. It is an object of the present invention to eliminate the screw jacks and provide a novel form of device for lifting the camper unit off the pickup truck, which device provides a particularly stable support for the camper unit in free-standing position. Other and more detailed objects and advantages will appear hereinafter.

IN THE DRAWINGS

Figure 1:
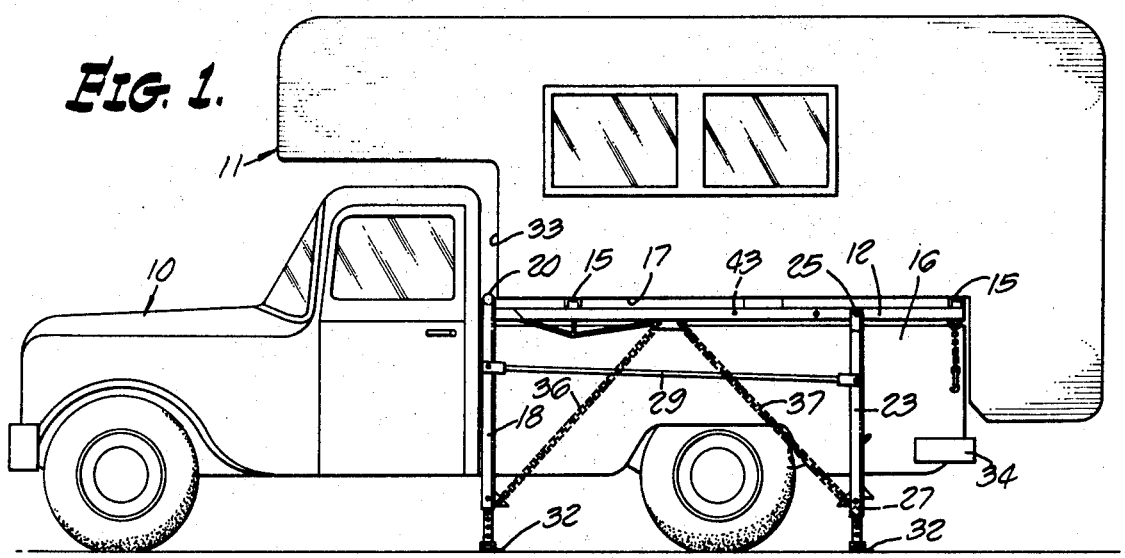
FIG. 1 is a side elevation showing a preferred embodiment of this invention, and showing the camper unit in free-standing position and with none of its weight supported on the pickup truck.

Referring to the drawings, the pickup truck 10 and the camper unit 11 are each of conventional design. In accordance with this invention, parallel side rails 12 and 13 are provided with support fingers 15 which project between the side support members 16 of the truck body and the side edge supports 17 on the camper unit. The rails 12 and 13 are spaced apart by a distance slightly greater than the width of the truck body.

Forward ground-engaging posts 18 and 19 are each fixed at the upper end to a transverse horizontal member 20 which provides stiffness and insures that the posts 18 and 19 remain parallel. The member 20 is pivotally supported at 21 and 22 on the forward ends of the side rails 12 and 13, respectively. The posts 18 and 19 and the horizontal member 20 thus comprise a forward support assembly having an inverted "U" shape. Rear ground-engaging posts 23 and 24 are each pivotally connected at 25 and 26, respectively, to the side rails 12 and 13. A second transverse horizontal member 27 is secured to the posts 23 and 24 at a location below their pivotal connections 25 and 26. This member 27 provides stiffness and insures that the posts 23 and 24 remain parallel. The posts 23 and 24 and the horizontal member 27 thus comprise a rearward support assembly having an upright "U" shape. A tie rod 29 pivotally connects the posts 18 and 23 and a duplicate tie rod 30 pivotally connects the posts 19 and 24, thereby insuring that all of the posts remain parallel.

The proportions of the parts are such that the horizontal member 20 is positioned just in back of the cab of the truck and just forward of the wall 33 of the camper unit 11, while the member 27 extends below the rear portion of the camper truck in the position shown in FIG. 1, and extends just back of the truck bumper 34 in the position shown in FIG. 2.

Each of the posts is provided with an adjustable extensible foot piece 32 for engagement with the ground surface.

Figure 2:
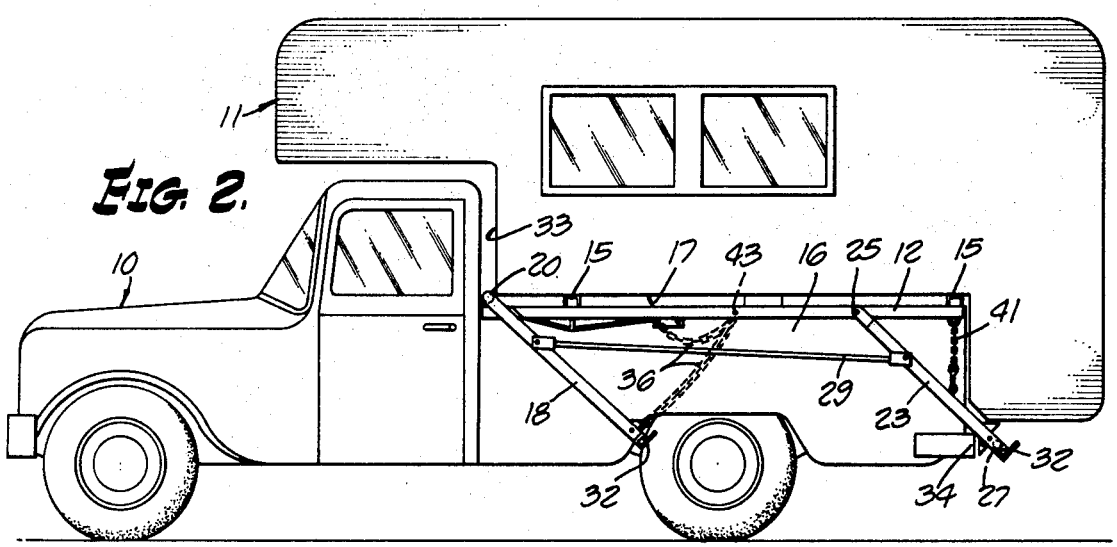
FIG. 2 is a side elevation showing the support device of this invention in folded or retracted position for travel, and with the full weight of the camper unit resting on the body of the pickup truck.
Figure 3:
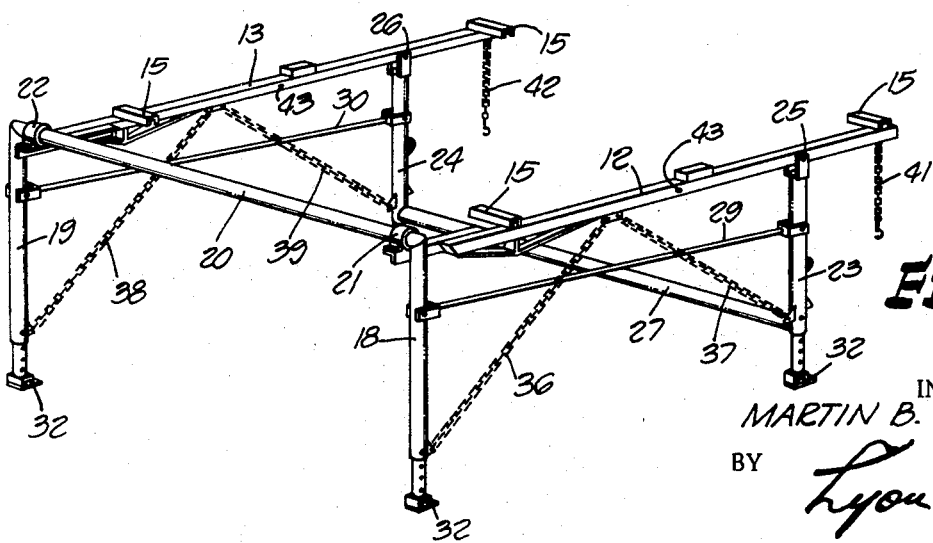
FIG. 3 is a perspective view showing the support device in the absence of the camper unit and pickup truck.

Tension chains 36, 37, 38 and 39 extend at an angle between each of the posts and one of the side rails, respectively, to prevent pivotal movement of the posts with respect to the side rails when the device is in the position shown in FIG. 1 or FIG. 3. The tension chains 37 and 39 are disconnected from the posts 23 and 24, respectively, when the parts are in the travel position shown in FIG. 2, and these chains are stored in a location not shown. Additional chains 41 and 42 serve to releasably support the posts in angular position for travel. The chains 36 and 38 are extended over hooks 43 to take up slack.

In operation, the camper unit 11 and pickup truck 10 travel together when the parts are in the travel position shown in FIG. 2. When it is desired to support the camper unit 11 independently of the pickup truck 10, the chains 41 and 42 are disconnected from the posts 23 and 24, respectively, and the chains 36 and 38 are disconnected from the hooks 43. All of the posts are allowed to swing by gravity until the foot pieces 32 engage the ground. The foot pieces are then adjusted so that they all engage the ground at the same time. The pickup truck 10 is then moved rearwardly for a sufficient distance to bring the posts to a vertical position, as shown in FIGS. 1 and 3. The chains 37 and 39 are then connected to the posts 23 and 24, respectively. The camper unit 11 is then supported in a free-standing position on the four posts, and the action of the chains 36, 37, 38 and 39 is to prevent pivotal movement of the posts with respect to the side rails 12 and 13. The horizontal members 20 and 27 provide the necessary stiffness against lateral movement of the free-standing camper unit 11. The pickup truck 10 may then be driven away from the free-standing camper unit 11. The camper unit 11 may be reinstalled on the pickup truck 10, by reversing the steps in the process just described.

Having fully described my invention, it is to be understood that I am not to be limited to the details herein set forth but that my invention is of the full scope of the appended claims.

I claim:

1. A support assembly for a camper unit normally carried upon a truck body behind the truck cab, comprising in combination: a pair of horizontally spaced side rails adapted to rest on the truck body behind the truck cab and adapted to support side edges of the camper unit, a forward support assembly having an inverted "U" shape and comprising parallel ground supporting posts fixed at their upper ends to a transverse horizontal member extending between them, pivot means connecting said horizontal member to each of the side rails at their forward ends, said transverse horizontal member being positioned so that, when the camper unit is carried on the truck body, said horizontal member is positioned between the truck cab and the camper unit, a rearward support assembly in the shape of an upright "U" comprising a pair of parallel posts connected by a second transverse horizontal member, means pivotally connecting the upper end of each of the latter said posts to the rear end of one of said side rails, respectively, said second transverse horizontal member being secured to each of the latter said posts below its pivotal connection to one of the side rails, said rear support assembly being movable to an inclined position in which said second transverse horizontal member is positioned rearward of the truck body, and a pair of tie rods each pivotally connecting a forward post to a rear post, to maintain all posts in parallel relationship, whereby the camper unit may be raised off the truck body by resting the lower ends of the posts in inclined position on the ground and then moving the truck body rearward to bring the posts to vertical position.

* * * * *